US012785783B2

(12) United States Patent
Koskela et al.

(10) Patent No.: US 12,785,783 B2
(45) Date of Patent: Nov. 3, 2026

(54) BEAM FAILURE RECOVERY

(71) Applicant: Nokia Technologies Oy, Espoo (FI)

(72) Inventors: Timo Koskela, Oulu (FI); Keeth Saliya Jayasinghe Laddu, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 266 days.

(21) Appl. No.: 18/695,928

(22) PCT Filed: Aug. 18, 2022

(86) PCT No.: PCT/EP2022/073072
§ 371 (c)(1),
(2) Date: Mar. 27, 2024

(87) PCT Pub. No.: WO2023/051995
PCT Pub. Date: Apr. 6, 2023

(65) Prior Publication Data

US 2024/0397504 A1 Nov. 28, 2024

(30) Foreign Application Priority Data

Oct. 1, 2021 (FI) ..................................... 20216022

(51) Int. Cl.
*H04W 72/044* (2023.01)
*H04B 7/06* (2006.01)

(52) U.S. Cl.
CPC ...... *H04B 7/06964* (2023.05); *H04W 72/046* (2013.01)

(58) Field of Classification Search
CPC ............... H04W 72/046; H04B 7/0695; H04B 7/06964; H04L 5/0035; H04L 5/0023
See application file for complete search history.

(56) References Cited

U.S. PATENT DOCUMENTS

2019/0222289 A1 7/2019 John Wilson et al.
2020/0374079 A1* 11/2020 Chervyakov ....... H04L 27/2657
(Continued)

FOREIGN PATENT DOCUMENTS

WO 2021/168241 A1 8/2021

OTHER PUBLICATIONS

International Search Report issued by the European Patent Office acting as the International Searching Authority in relation to International Application No. PCT/EP2022/073072 dated Feb. 13, 2023 (7 pages).

(Continued)

*Primary Examiner* — Brian D Nguyen
(74) *Attorney, Agent, or Firm* — Carter, DeLuca & Farrell LLP

(57) ABSTRACT

Inter-alia, a method is disclosed comprising: obtaining a configuration of one or more resource sets enabling a single frequency network, SFN, operation of the apparatus in a communication network; obtaining association information indicative of one or more downlink resources of a cell of the communication network that is valid for the SFN operation of the apparatus; detecting a beam failure for at least one of the resource sets of the configuration; and in response to the detecting of the beam failure, selecting at least one candidate beam based on the obtained association information enabling to continue the SFN operation of the apparatus. It is further disclosed an according apparatus, computer program and system.

1 Claim, 4 Drawing Sheets

(56) References Cited

U.S. PATENT DOCUMENTS

| | | | | |
|---|---|---|---|---|
| 2021/0083833 | A1 | 3/2021 | Zhou et al. | |
| 2021/0153040 | A1 | 5/2021 | Zhou et al. | |
| 2021/0242922 | A1 | 8/2021 | Koskela et al. | |
| 2021/0258940 | A1* | 8/2021 | Kim | H04L 5/0094 |
| 2022/0295544 | A1* | 9/2022 | Wei | H04W 74/04 |
| 2023/0379739 | A1* | 11/2023 | Kim | H04B 7/0626 |
| 2024/0163065 | A1* | 5/2024 | Sun | H04L 5/0025 |
| 2024/0275560 | A1* | 8/2024 | Matsumura | H04W 72/232 |
| 2024/0407037 | A1* | 12/2024 | Matsumura | H04B 7/06968 |

OTHER PUBLICATIONS

Written Opinion of the International Searching Authority issued by the European Patent Office acting as the International Searching Authority in relation to International Application No. PCT/EP2022/073072 dated Feb. 13, 2023 (12 pages).

Nokia et al. "Enhancements for HST-SFN deployment;" 3GPP Draft; RI-2108056, 3rd Generation Partnership Project (3GPP), Mobile Competence Centre; 650, Route Des Lucioles; F-06921 Sophia-Antipolis Cedex: France vol. RAN WGI, No. e Meeting; Aug. 16, 2021-Aug. 27, 2021 Aug. 6, 2021 (Aug. 6, 2021), XP052033753, Retrieved from the Internet: <URL:https://ftp.3gpp.org/tsg_ran/WG1_RL1/TSGR1_106-e/Docs/RI-2108056.zip RI-2108056_M-TRP HST-SFN.docx [retrieved on Aug. 6, 2021] pp. 1-2, 7-p. 12.

Nokia et al: "Enhancements on Beam Management for Multi-TRP", 3GPP Draft; RI-2105275, 3rd Generation Partnership Project (3GPP), Mobile Competence Centre; 650, Route Des Lucioles; F-08921 Sophia-Antipolis Cedex; France vol. RAN WGI, No. e-Meeting; May 19, 2021-May 27, 2021 May 11, 2021 (May 11, 2021), XP052006333, Retrieved from the Internet: <URL:https://ftp.3gpp org/tsg_ran/WG1_RL1/TSGR1_105-e/Docs/RI-2105275.zip RI-2105275_Enhancements on Beam Management.docx [retrieved on May 11, 2021] pp. 1-2, 7-p. 12.

Intel Corporation: "Views on DL Transmission schemes for NR HST-SFN", 3GPP Draft; R4-1913428, 3rd Generation Partnership Project (3GPP), Mobile Competence Centre; 650, Route Des Lucioles: F-06921 Sophia-Antipolis Cedex; France vol. RAN WG4, No. Reno, USA; Nov. 18, 2019-Nov. 22, 2019 Nov. 8, 2019 (Nov. 8, 2019), XP051818033, Retrieved from the Internet: <URL:https://ftp.3gpp.org/tsg_ran/WG4_Radio/TSGR4_93/Docs/R4-1913428.zip R4-1913428—Intel—Tx Schemes for HST-SFN deployment.docx [retrieved on Nov. 8, 2019] p. 1.

Huawei et al: "Remaining issues on beam failure recovery", 3GPP Draft; RI-1801454, 3rd Generation Partnership Project (3GPP), Mobile Competence Centre; 650, Route Des Lucioles: F-06921 Sophia-Antipolis Cedex; France vol. RAN WGI, No. Athens, Greece; Feb. 26, 2018-Mar. 2, 2018 Feb. 16, 2018 (Feb. 16, 2018), XP051397418, Retrieved from the Internet: URL:http://www.3gpp.org/ftp/tsg%5Fran/WG1%5FRL1/TSGR1%5F92/Docs/ [retrieved on Feb. 16, 2018] p. 6-p. 7.

"Revised WID: Further enhancements on MIMO for NR", 3GPP TSG RAN Meeting #92e, RP-211586, Agenda: 9.7.1.1, Samsung, Jun. 14-18, 2021, 6 pages.

"3rd Generation Partnership Project; Technical Specification Group Radio Access Network; NR; Physical Layer Procedures for Control (Release 16)", 3GPP TS 38.213, V16.6.0, Jun. 2021, pp. 1-187.

"3rd Generation Partnership Project; Technical Specification Group Radio Access Network; NR; NR and NG-RAN Overall Description; Stage 2 (Release 16)", 3GPP TS 38.300, V16.6.0, Jun. 2021, pp. 1-152.

"3rd Generation Partnership Project; Technical Specification Group Radio Access Network; NR; Medium Access Control (MAC) Protocol Specification (Release 16)", 3GPP TS 38.321, V16.5.0, Jun. 2021, pp. 1-157.

Office action received for corresponding Finnish U.S. Patent Application No. 202106022, dated Apr. 11, 2022, 6 pages.

Invitation to Pay Additional Fees received for corresponding Patent Cooperation Treaty Application No. PCT/EP2022/073072, dated Nov. 14, 2022, 10 pages.

* cited by examiner

BEAM FAILURE RECOVERY

CROSS-REFERENCE TO RELATED APPLICATIONS

This application is a national phase entry under 35 U.S.C. 371 of PCT International Application No. PCT/EP2022/073072 filed Aug. 18, 2022, which claims priority to Finnish Patent Application No. 20216022, filed Oct. 1, 2021, the disclosure of each of these applications is expressly incorporated herein by reference in their entirety.

FIELD

The following disclosure relates to the field of radio networks, or more particularly relates to systems, apparatuses, and methods for beam failure recovery in Single Frequency Network (SFN) operation.

BACKGROUND

In 3GPP RAN1, one of the open discussion points for Quasi Co-Location (QCL) assumption (for Physical Data Control Channel (PDCCH) Demodulation Reference Signal (DMRS)) is the case of two activated Transmission Control Configuration Indication (TCI) states per Control Resource Set(s) (CORESET(s)). From a SFN operation perspective, it is imperative to know at both user equipment (UE) and network (NW) side whether or not the SFN operation can continue as a result of beam failure recovery (BFR). As the SFN operation requires specific conditions e.g. reception assumptions at UE and the transmission assumptions at network, it is clear or even possible to determine the operation mode (e.g. SFN or no SFN) after gNB response for BFR as currently, UE can select any suitable candidate beam RSRP (the RSRP value of the downlink reference signal (DL RS)) is above an RSRP threshold value. UE may therefore choose any candidate that is determined to be suitable from the quality perspective but may be problematic from SFN operation perspective.

With regard to link recovery procedure, e.g. in case a beam failure is detected, in New Radio (NR) communication networks, a beam failure is detected for a serving cell when all the Beam Failure Detection (BFD) Resources (BFD-RS) in a set of 40 (BFD-RS set) are in failure condition. The BFD-RS can be configured in explicit or implicit manner as per 3GPP TS 38.213 definition. On implicit configuration of the BFD-RS, 3GPP TS 38.213 states the following:

A UE can be provided, for each BWP of a serving cell, a set $\overline{q}_0$ of periodic CSI-RS resource configuration indexes by failureDetectionResourcesToAddModList and a set $\overline{q}_1$ of periodic CSI-RS resource configuration indexes and/or SS/PBCH block indexes by candidateBeamRSList or candidateBeamRSListExt or candidateBeamRSSCellList for radio link quality measurements on the BWP of the serving cell. If the UE is not provided $\overline{q}_0$ by failureDetectionResourcesToAddModList for a BWP of the serving cell, the UE determines the set $\overline{q}_0$ to include periodic CSI-RS resource configuration indexes with same values as the RS indexes in the RS sets indicated by TCI-State for respective CORESETs that the UE uses for monitoring PDCCH and, if there are two RS indexes in a TCI state, the set 40 includes RS indexes configured with qcl-Type set to 'typeD' for the corresponding TCI states. The UE expects the set $\overline{q}_0$ to include up to two RS indexes. The UE expects single port RS in the set $\overline{q}_0$. The UE expects single-port or two-port CSI-RS with frequency density equal to 1 or 3 REs per RB in the set $\overline{q}_1$.

This means that per each CORESET with activated TCI state, there can be only one activated TCI state for each CORESET. The UE determines to include one RS to the set of 40 (BFD-RS set). For respective TCI state, if two RS are configured for the TCI state, UE determines to include the RS providing the qcl-typeD source RS to the set of $\overline{q}_0$.

3GPP RAN1 standardization considers an enhancement on the aforementioned recovery procedures to enable more efficient multi-TRP (mTRP) operation. In mTRP BFR, UE may be configured with two sets of beam failure detection resource (BFD-RS) where each TRP is associated with a BFD-RS set. UE may be further configured with a candidate RS set that is associated with the beam failure detection RS set. When a beam failure is detected for the set of $\overline{q}_0$, the UE can be configured to indicate candidate beam RS index (a new beam, DL RS) that is suitable (RSRP above threshold level).

3GPP RAN1 further considers an enhancements on high-speed train (HST) scenario where SFN PDCCH/PDSCH transmissions are considered towards the UE. For SFN PDCCH transmissions, the UE can be configured with two active TCI states per each CORESET. From beam failure detection perspective, this means that the following options are possible for determining BFD-RS based on implicit and explicit configuration:

For a CORESET with two active TCI states,

- UE may determine to include two RSs indicated by the active TCI states to one BFD-RS set of $\overline{q}_0$ (the qcl-typeD if configured).
- UE may determine to include two RSs indicated by the active TCI states to two different BFD-RS sets of $\overline{q}_0$ (the qcl-typeD RS if configured) i.e. there would be two sets of BFD-RS $\overline{q}_0$ #0 and $\overline{q}_0$ #1.
- UE may determine to include only one of two RSs indicated by the activate TCI states to one BFD-RS set of $\overline{q}_0$ (the qcl-typeD if configured). The second RS may not be included in the other BFD-RS set.

Also, SCell (Secondary Cell) beam failure recovery was specified. One of the aspects in the recovery was to define the UE assumption for the PDCCH monitoring for one or more of the CORESETs after indicating a candidate beam to network and receiving the gNB response. It states that after indicating a candidate beam to network, the UE, after gNB response (28 symbols after) UE determines to monitor PDCCH on CORESETs for the failed cell with QCL assumption based on the indicated candidate beam ($\overline{q_{new}}$). In other words, UE monitors PDCCH on all the configured CORESETs with the assumption that PDCCH DMRS are qcl'd with DL RS indicated as $\overline{q_{new}}$.

A UE can be provided, by schedulingRequestID-BFR-SCell, a configuration for PUCCH transmission with a link recovery request (LRR). The UE can transmit in a first PUSCH MAC CE providing index(es) for at least corresponding SCell(s) with radio link quality worse than $Q_{out,LR}$, indication(s) of presence of $q_{new}$ for corresponding SCell(s), and index(es) $q_{new}$ for a periodic CSI-RS configuration or for a SS/PBCH block provided by higher layers, if any, for corresponding SCell(s). After 28 symbols from a last symbol of a PDCCH reception with a DCI format scheduling a PUSCH transmission with a same HARQ process number as for the transmission of the first PUSCH and having a toggled NDI field value, the UE monitors PDCCH in all CORESETs on the SCell(s) indicated by the MAC CE using the same antenna port quasi co-location parameters as the ones associated with the corresponding index(es) $q_{new}$, if any transmits PUCCH on a PUCCH-SCell using a same spatial domain filter as the one corresponding to $q_{new}$, if any, for periodic CSI-RS or SS/PBCH block reception, and using a power determined with $q_u=0$, $q_d=q_{new}$, and $l=0$, if the UE is provided PUCCH-SpatialRelationInfo for the PUCCH, a PUCCH with the LRR was either not transmitted or was transmitted on the PCell or the PSCell, and the PUCCH-SCell is included in the SCell(s) indicated by the MAC-CE where the SCS configuration for the 28 symbols is the smallest of the SCS configurations of the active DL BWP for the PDCCH reception and of the active DL BWP(s) of the at least one SCell.

With regard to High Speed Train (HST)-SFN operation, in the following referred to as SFN operation, SFN supports two different modes of operations in 3GPP Release 17, one mode (refer as Scheme 1 in RAN1 discussions) is allowing Doppler estimations and cancellations at the UE side and the other mode (refer as TRP-based frequency offset pre-compensation) estimating Doppler offsets at the network node and transmitting frequency pre-compensated PDCCH/PDSCH.

SFN Mode 1:

UE-based Doppler estimation/compensation (Scheme 1). Details in summary in the following:

TRS is transmitted in TRP-specific/non-SFN manner

DM-RS and PDCCH/PDSCH from TRPs are transmitted in SFN manner

The same DMRS port(s) can associate with two TCI states, where the TCI states either activated (for CORESETs) or indicated in the DCI (for PDSCH).

When the same DMRS port(s) are associated with two TCI states containing TRS as source reference signal, both TCI states can be associated with {average delay, delay spread, Doppler shift, Doppler spread} (i.e., QCL-TypeA). Here, QCL information provided in both TCI states are used at the UE.

UE is not expected to be indicated by MAC CE with single TCI state per any of TCI codepoint, if UE is configured with scheme 1 PDSCH by RRC, but not capable to support dynamic switching between scheme 1 and single-TRP by TCI state field in DCI Format 1_1/1_2. Here, UE only operate with SFN mode, RRC reconfiguration may be needed to switch to single TCI operation.

SFN Mode 2:

TRP-based frequency offset pre-compensation scheme. Details in summary in the following:

TRS is transmitted in TRP-specific/non-SFN manner. Transmission of the uplink signal(s)/channel(s) with carrier frequency determined based on the received TRS signals.

Network determines Doppler shift(s) using uplink signal(s) transmitted on the carrier frequency acquired in the earlier step of TRP transmission.

The same DMRS port(s) can associate with two TCI states, where the TCI states either activated (for CORESETs) or indicated in the DCI (for PDSCH).

Transmission of the PDCCH/PDSCH from TRP(s) with frequency offset pre-compensation determined based on the received uplink signal(s) at the network.

When the same DMRS port(s) are associated with two TCI states containing TRS as source reference signal, both TCI states can be associated with {average delay, delay spread, Doppler shift, Doppler spread} (i.e., QCL-TypeA). QCL parameters are dropped from the second TCI state of the indicated TCI codepoint containing two TCI states. Here, not all QCL information provided in both TCI states are used at the UE.

Based on UE capabilities, support dynamic (DCI-based) switching with single-TRP scheme by TCI state field in DCI format 1_1/1_2.

Both SFN mode 1 and 2 are applicable for PDCCH, therefore RAN1 agreed to support MAC CE activation of two TCI states for PDCCH. Also, enhanced SFN PDCCH transmission scheme (mode 1 or mode 2) is identified by the number of TCI states activated per CORESET and RRC parameter. When RRC is identifying the SFN PDCCH operation, it is not feasible to switch to another mode of operation, as highlighted before, depending on the capability of the UE.

For the case of all CORESETs with one activated TCI state per CORESET, after a certain amount of symbols from receiving the BFR response, the QCL assumption of all CORESETs associated with the failed BFD-RS set reported in the MAC-CE for TRP-specific BFR is updated by the RS resource associated with the latest reported new candidate beam (if found) associated with the failed BFD-RS set.

SUMMARY OF SOME EXEMPLARY EMBODIMENTS

However, it is left open in the case of CORESETs e.g. with two activated TCI states per CORESET how BFR should be handled. It should be noted that any of the embodiments may improve the communication in general and the BFR improvements described herein are not limited for SFN operation.

It is thus, inter alia, an object to improve BFR for SFN operation.

According to a first exemplary aspect, a method is disclosed, the method comprising:

obtaining a configuration of one or more resource sets enabling a single frequency network, SFN, operation of the apparatus in a communication network;

obtaining association information indicative of one or more downlink resources of a cell of the communication network that is valid for the SFN operation of the apparatus;

detecting a beam failure for at least one of the resource sets of the obtained configuration; and in response to the detecting of the beam failure, selecting at least one candidate beam based on the obtained association information enabling to continue the SFN operation of the apparatus.

This method may for instance be performed and/or controlled by a first apparatus, for instance a user equipment (UE). For instance, the method may be performed and/or controlled by using at least one processor of the UE.

According to a second exemplary aspect, a method is disclosed, the method comprising:

determining a configuration of one or more resource sets for a user equipment, UE, in a communication network, wherein the one or more resource sets enable a single frequency network, SFN, operation of the UE in a communication network;

providing, to the UE, the determined configuration; and providing, to the UE, association information indicative of one or more downlink resources of a cell which are valid for the SFN operation of the UE.

This method may for instance be performed and/or controlled by a second apparatus, for instance a network node/network entity (e.g. a base station). For instance, the method may be performed and/or controlled by using at least one processor of the network node/network entity.

The first apparatus/the apparatus according to the first example aspect may be a UE in various embodiments. For instance, it may be a UE of a mobile communication network, for instance a 3G, LTE/4G, 5G NR, or 5G network. Further, it may be a mobile device, e.g. a hand-set, a smartphone, a tablet, a laptop, or any other mobile device. In various embodiments, it may be a vehicle for travelling in air, water, or on land, e.g. a plane or a drone, a ship or a car or a truck. It may also be a robot, a sensor device, a wearable device, an Internet of Things (IoT) device, a Machine Type Communication (TC) device, or the likes.

The second apparatus/the apparatus according to the second example aspect may be a network node/network entity in various embodiments. For instance, it may be a network entity of a mobile communication network, for instance a 3G, LTE/4G, 5G NR, or 5G network. For instance, it may be a base station, e.g. a NodeB, eNB or gNB, or an access point, an access node, etc. It may also be part of and/or connected with any other network.

Furthermore, a system is disclosed, the system comprising at least a first apparatus and a second apparatus, e.g. an apparatus according to the first example aspect and an apparatus according to the second example aspect, respectively.

According to a further exemplary aspect, a computer program is disclosed, the computer program when executed by a processor causing an apparatus, for instance a server, to perform and/or control the actions of the method according to the first and/or second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect, an apparatus is disclosed, configured to perform and/or control or comprising respective means for performing and/or controlling the method according to the first and/or second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect, an apparatus is disclosed, comprising at least one processor and at least one memory including computer program code, the at least one memory and the computer program code configured to, with the at least one processor, cause an apparatus, for instance the apparatus, at least to perform and/or to control the method according to the first and/or second exemplary aspect.

The above-disclosed apparatus according to any aspect may be a module or a component for a device, for example a chip. Alternatively, the disclosed apparatus according to any aspect may be a device, for instance a server or server cloud. The disclosed apparatus according to any aspect may comprise only the disclosed components, for instance means, processor, memory, or may further comprise one or more additional components.

In the following, exemplary features and exemplary embodiments of all aspects will be described in further detail.

The configuration is obtained, e.g. by receiving the configuration. The configuration may for instance be received from an apparatus according to the second exemplary aspect. The configuration is obtained, e.g. by retrieving the configuration, e.g. from a memory that is comprised by or connectable to the apparatus according to the first exemplary aspect. The configuration may comprise the one or more resource sets. The one or more resource sets of the configuration may be a plurality (e.g. at least two) of resource sets. Thus, after the configuration is obtained, the apparatus may be configured with a plurality of resource sets. Also, the apparatus according to the first exemplary aspect may be configured with one resource set, e.g. a control resource set (CORESET). Thus, a respective resource set of the configuration may be a control resource set. A respective resource set may enable a SFN operation of the apparatus according to the first exemplary aspect in a communication network. A respective resource set may have one, two or more activated TCI states per resource set (e.g. a control resource set). A respective resource set may be used by the apparatus according to the first exemplary aspect for SFN operation. A TCI State may indicate at least one reference signal (RS) that may be used for reception assumption for the PDCCH for at least one CORESET.

According to an exemplary embodiment of all exemplary aspects, the SFN operation is enabled by a respective resource set by, based on the respective resource set, two or more activated transmission configuration indication states are applied for receiving control information. The control information may be RRC message(s) that may be provided (e.g. sent) to the respective apparatus according to the first exemplary aspect, e.g. by the apparatus according to the second exemplary aspect. A respective resource set of the one or more resource sets may comprise one or more resources. In case a respective resource set of the one or more resource sets comprises one resource, the obtained configuration may comprise at least two resource sets. In case a respective resource set of the one or more resource sets comprises more than one resource (e.g. two resources), the obtained configuration may comprise at least two resources. The at least two resources of the configuration enable SFN operation. The configuration may also comprise one or more resource sets which configure the UE with two or more resources (e.g. in total) that enable SFN operation.

Such a SFN operation, as used herein, is understood as the communication network performing and/or controlling a same transmission from multiple points (e.g. one or more base stations (e.g. apparatus(s) according to the second exemplary aspect) of one or more cells) to the apparatus. The transmission(s) may be synchronized. In particular, such a SFN operation enables high speed (mobility) operation. The same transmission may be sent by the mobile communication network over a same frequency channel.

The one or more resource sets may be configured, e.g. by obtaining (e.g. receiving) the configuration enabling the apparatus according to the first exemplary aspect to configure the one or more resource sets. For instance, such a configuring may comprise storing the one or more resource sets in a memory that is comprised by or connectable to the apparatus. The one or more resource sets may for instance comprise or be represented by a set of $\overline{q}_0$. The one or more resource sets may for instance comprise or be represented by one or more downlink resources respectively resource sets which the apparatus according to the first exemplary aspect can utilize in case a current used resource has a failure, e.g. low channel quality influencing the performance of a data transmission, to name but one non-limiting example. The one or more resource sets may enable the SFN operation at least in the downlink (DL), data transmission(s) from an apparatus according to the second exemplary aspect to the apparatus according to the first exemplary aspect. A respective resource set of the one or more resource sets may comprise one or more resources defining a certain beam to be used by the apparatus according to the first exemplary aspect for such one or more downlink transmission(s).

The association information is obtained (e.g. received), e.g. from a base station of the mobile communication network. The association information may be configured on part of the apparatus according to the first exemplary aspect, e.g. the obtaining (e.g. receiving) the association information. The association information may be obtained from an apparatus according to the second exemplary aspect. The association information is indicative of one or more (e.g. downlink) resources respectively resource sets that is/are valid for the SFN operation of the apparatus. Further, the association information may be indicative of one or more further downlink resources that are associated with/linked to the one or more downlink resource that is valid for the SFN operation of the apparatus according to the first exemplary aspect. Due to the association between suitable downlink resource(s), in case of a beam failure, the apparatus according to the first exemplary aspect may assume that the associated downlink resources supports SFN operation.

In an example embodiment according to all exemplary aspects, the apparatus according to the first exemplary aspect (e.g. a UE) obtains the association information comprising an association between at least one (e.g. downlink) resource (e.g. a first resource) and at least one other (e.g. downlink) resource (e.g. second resource that is different from the first resource). The association between the first resource and the second resource may for instance be used for the SFN operation. Thus, such an association that may be comprised or be represented by the association information may be for beam failure recovery purposes.

In an example embodiment according to all exemplary aspects, when the apparatus according to the first exemplary aspect (e.g. a UE) obtains an association (e.g. comprised by the association information) of at least one (e.g. downlink) resource and at least one other (e.g. downlink) resource, the apparatus according to the first exemplary aspect can assume that the resource(s) (e.g. both resources) can be used for SFN operation.

A beam failure is detected by the apparatus according to the first exemplary aspect. The beam failure is detected for at least one of the configured resource sets. The beam failure(s) may be detected, e.g. based on a set of $\overline{q}_0$. Such a set of $\overline{q}_0$ may comprise or represent one or more radio link quality/qualities to be monitored by the apparatus according to the first exemplary aspect. Such one or more radio link quality/qualities may be compared to a pre-defined threshold, e.g. by the apparatus according to the first exemplary aspect.

The beam failure(s) may be detected of one or more control resource set(s). The beam failure(s) may be detected, e.g. based on one or more resources configured for one or more beam failure detection resource sets (BFD-RS sets) e.g. associated with (e.g. the) one or more control resource sets.

Further, for instance, if there are two TCI states configured on part of the apparatus according to the first exemplary aspect (e.g. a UE), and one of the two TCI states fail, thus, a beam failure is detected/determined, the apparatus according to the first exemplary aspect may determine the RS indicated by non-failed TCI state and selects the at least one candidate beam based on the (SFN) association information, e.g. provided by the apparatus according to the second exemplary aspect (e.g. a base station, network).

In response to the detecting of a respective beam failure, at least one candidate beam is selected based, at least in part, on the obtained association information enabling to continue the SFN of the apparatus according to the first exemplary aspect. The selected at least one candidate beam may for instance be provided, e.g. by sending the selected at least one candidate beam to the apparatus according to the second exemplary aspect. The selected at least one candidate beam may be provided in the form of a candidate beam information, to name but one non-limiting example.

For instance, a specific threshold may be configured for the selecting of the at least one candidate beam. Such a specific threshold may be used to e.g. determine for one or more associated (e.g. downlink) resources to select a respective resource that e.g. may have at least a certain channel quality while being valid for SFN operation, to name but one non-limiting example. As an example, the specific threshold may have a lower Received Signal Reception Power (RSRP) than comparable resources if for the at least one candidate beam to be selected the respective resource enable SFN operation of the apparatus according to the first exemplary aspect, and/or if the SFN operation of the apparatus according to the first exemplary aspect can continue on the respective resource/resource set. As a further example, the specific threshold may be configured for at least one candidate beam to be selected for the SFN operation (the specific threshold may be e.g. a Received Signal Reception Power (RSRP) threshold).

The apparatus according to the first exemplary aspect, when using SFN, can be provided with additional information in the form of the association information, e.g. about a suitability of one or more radio beams (or downlink Resources (DL RS)) for SFN operation. So, e.g. when two DL RSs are used in SFN, and at least one fails, the association information can be used in determining (e.g. selecting) whether or not the SFN operation of the apparatus according to the first exemplary aspect can continue. This can be done by selecting a suitable candidate beam of a cell of the radio network (e.g. mobile communication network). For instance, some candidate beams when e.g. comparing if a RSRP is greater than a pre-determined (e.g. network configured) threshold might not be suitable for SFN operation. The association information may, thus, comprise one or more resources or one or more resource sets that are valid for SFN operation of the apparatus according to the first exemplary aspect, or of one or more resources or one or more resource sets that are associated with respectively linked to such one or more downlink resources, so that the latter downlink resources can be assumed to support SFN operation for the apparatus according to the first exemplary aspect due to their association/link to one or more downlink resources that are valid for SFN operation of the apparatus according to the first exemplary aspect.

In an example embodiment according to all exemplary aspects, for instance, two groups of DL RSs can be associated with each other. This association may be used in the selecting (e.g. determining) which (candidate) beam(s) can be used for SFN operation in BFR. For instance, if a respective beam in one of the groups fails, another can be selected from that group (given that other "normal" requirements for BFR are met, e.g. RSRP>pre-determined threshold). This may allow using additional association information (e.g. that may be restrictive information) for the selecting of the at least one candidate beam in SFN operation.

With regard to which beams are valid for SFN, a criteria for a beam or one or more beams to be valid may be coming from network implementation constraints. For instance, the mobile communication network may use a sub-set of TRPs, where simultaneous multi-panel transmission by a single TRP may not be feasible. One or more selected beam pairs may not be associated with a single TRP. Further, there may be other implementation concerns to limit the beam(s) that are valid for SFN mode/operation. The above mentioned example is for exemplary purposed.

In this way, it may be allowed to provide continuity for SFN operation which allows high speed (mobility) communication. Further, it may be allowed that the apparatus according to the first exemplary aspect can be configured to select (e.g. more) relevant candidates/candidate beams for its operation resulting in lower power consumption, lower signaling overhead between the communication network and the apparatus according to the first exemplary aspect, increased throughput and increased reliability for SFN/high speed deployment.

The mobile communication network is a radio network, for example a LTE (Longterm Evolution), 5G NR, or 5GC (5G core) network.

According to an exemplary embodiment of all exemplary aspects, the SFN operation is within a serving cell or within one or more cells having a same identifier as a serving cell identifier of a respective serving cell of the apparatus.

This may allow that the apparatus according to the first exemplary aspect (e.g. a UE) is configured with the association information indicative of which of one or more (e.g. downlink) resources/resource sets of a (e.g. serving) cell can be assumed to be valid for SFN operation e.g. within the serving cell. In addition or in the alternative, one or more transmission and reception points (TRPs) that may have a different Physical Cell Identity (PCI)/Identities but operate under same serving cell ID may also provide a respective resource/resource set that can be selected as the at least one candidate beam. For instance, a resource of a cell operating under a same cell identifier as the serving cell of the apparatus according to the first exemplary aspect may be selected. Such information may be comprised by the association information that is obtained. Further, such association information may be the basis for BFR as disclosed, e.g. even more specifically in the at least one candidate beam selecting. The at least one candidate beam selecting may allow an assumption for continuing or discontinuing SFN operation of the apparatus according to the first exemplary aspect.

According to an exemplary embodiment of the first exemplary aspect, the association information is obtained (e.g. received from an apparatus according to the second exemplary aspect) as part of one or more of the following:

i) beam management configuration;

ii) cell level configuration;

iii) beam failure recovery configuration;

iv) a certain candidate beam configuration of a beam failure recovery configuration; and v) a certain candidate beam configuration of a multiple transmission and reception, mTRP, beam failure recovery configuration.

According to an exemplary embodiment of the second exemplary aspect, the association information is provided (e.g. sent to an apparatus according to the first exemplary aspect) as part of one or more of the following:

i) beam management configuration;

ii) cell level configuration;

iii) beam failure recovery configuration;

iv) a certain candidate beam configuration of a beam failure recovery configuration; and v) a certain candidate beam configuration of a multiple transmission and reception, mTRP, beam failure recovery configuration.

A respective beam management configuration may be indicative of a set of TRP and/or UE beams that can be used by the apparatus according to the first exemplary aspect (e.g. a UE) for at least downlink transmissions. One or more reference signals may be used for enabling beam management. For instance, SSB may be used for beam management during IDLE mode of the apparatus according to the first exemplary aspect, and/or CSI-RS in the downlink may be used during (e.g. RRC) CONNECTED mode of the apparatus according to the first exemplary aspect for beam management.

In one example embodiment, the apparatus according to the first exemplary aspect (e.g. a UE) obtains (e.g. is configured with) the association information indicative of which of one or more (e.g. downlink) resources/resource sets of a (e.g. serving) cell can be assumed to be valid for SFN operation e.g. within the serving cell. A CORESET may have two active TCI States indicating at least one DL RS. The DL RS may be monitored for beam failure in respective sets of $\overline{q}_0$ (e.g. BFD-RS sets, set #1 and set #2). In some cases, one TCI State can indicate two RS providing different qcl-types (e.g. qcl-typeA and qcl-typeD (spatial RX)) and the apparatus according to the first exemplary aspect (e.g. a UE) may select the RS providing the qcl-typeD to be included into the BFD-RS set. The apparatus according to the first exemplary aspect (e.g. a UE) may detect beam failure on at least the BFD-RS set (e.g. failure is detected on one of the BFD-RS sets (e.g. set #1) comprising the RS indicated by one of the TCI states for a CORESET). The apparatus according to the first exemplary aspect it has detected beam failure on at least one of the BFD-RS sets, the apparatus according to the first exemplary aspect may determine the RS index (indicated by the TCI state) that has not failed. The RS index may be SSB index, SSB resource indicator, CSI-RS index, CSI-RS resource indicator or other DL RS index. In some cases, the apparatus according to the first exemplary aspect (e.g. a UE) may determine the QCL source RS of the RS indicated by the active TCI State (e.g. CSI-RS may have QCL source RS which is an SSB or another CSI-RS). The determined DL RS may be used for selecting the suitable at least one candidate beam (e.g. from a candidate beam RS list) that are valid for SFN operation based on the (e.g. configured) association information between one or more DL RS for SFN operation.

For cell level configuration, CSI-RS may be used to obtain the association information via the cell level configuration.

Beam failure recovery configuration may for instance be configured via a respective RRC message. The beam failure recovery configuration may be used by the apparatus according to the first exemplary aspect. The beam failure recovery configuration may comprise a set of resources for the beam recovery procedure, e.g. wherein the apparatus according to the first exemplary aspect may perform Random Access Channel (RACH) procedure on the selected at least one candidate beam or the apparatus according to the first exemplary aspect (e.g. a UE) may indicate the selected at least one candidate beam using MAC layer signaling (e.g. MAC CE, MAC Control Element). Besides a set of resources for the beam recovery procedure, the beam failure recovery configuration may comprise the association information. This may allow the apparatus according to the first exemplary aspect to be configured with the association information. This may further the selecting of the at least one candidate beam on which SFN operation can be continued or discontinued by the apparatus according to the first exemplary aspect. In addition or in the alternative, the beam failure recovery configuration may comprise a certain candidate beam configuration, and/or a certain candidate beam configuration of a multiple transmission and reception point, mTRP, beam failure recovery configuration. The apparatus according to the first exemplary aspect may be provided with such a certain candidate beam configuration and/or certain candidate beam configuration of a mTRP beam failure recovery configuration via a respective RRC message, to name but one non-limiting example.

According to an exemplary embodiment of all exemplary aspects, the association information further comprises an association between at least one first resource and at least one second resource (e.g. that is different from the first resource and that is used for the SFN operation, wherein the candidate beam is selected based, at least in part, on an assumption that the at least one second resource is valid for SFN operation if the at least one first resource is valid for SFN operation.

For instance, the apparatus according to the first exemplary aspect (e.g. a UE) obtains or is provided with association information comprising an association between at least one resource (e.g. the first resource) and at least one other resource (e.g. the second resource). The resource may refer to SSB and/or CSI-RS. The association information respectively the association comprised by the association information may be used for SFN operation as follow:

The association may be indicated in a group-wise association: a set/group of resources (e.g. Synchronization Signal Block (SSB) SSB #1, SSB #2) can be configured with an association of another group of resources (SSB #3, SSB #4)

For selecting the at least one candidate beam, the apparatus according to the first exemplary aspect may select any SSB in such a first group and any of the second group, and may assume SFN operation for any of the resources of the respective groups.

According to an exemplary embodiment of all exemplary aspects, a respective candidate beam is selected for a respective beam failure that is detected.

According to an exemplary embodiment of all exemplary aspects, the UE respective the apparatus according to the first exemplary aspect may determine a suitable candidate (e.g. the at least one candidate beam to be selected) for SFN operation based on such a RS index value and/or the QCL source RS index of a resource.

If a beam failure is detected for two resource sets of the one or more resource sets, in this case at least two resource sets, two candidate beams can be selected by the apparatus according to the first exemplary aspect. For instance, the groups of resources may overlap e.g. by network configuration but the apparatus according to the first exemplary aspect may select a different resource as the at least one candidate beam or at least two candidate beams (e.g. when beam failure occurs in two resource sets and, thus, recovering of two resource sets is performed and/or controlled) if the apparatus according to the first exemplary aspect obtains (e.g. is provided with) the association information for SFN operation.

According to an exemplary embodiment of the first exemplary aspect, the method further comprises:

providing (e.g. sending) the selected at least one candidate beam.

The selected at least one candidate beam may be provided, by sending the at least one candidate beam to the apparatus according to the second exemplary aspect, e.g. a base station (e.g. gNB) of a serving cell of the apparatus according to the first exemplary aspect.

According to an exemplary embodiment of the first exemplary aspect, the method further comprises:

obtaining (e.g. receiving) a response to the provided and selected at least one candidate beam; and assuming control channel reception (e.g. PDCCH) based on the selected at least one candidate beam (e.g. part of a new resource set used by the apparatus).

According to an exemplary embodiment of the second exemplary aspect, the method further comprises:

obtaining (e.g. receiving) a candidate beam information indicative of a selected at least one candidate beam for continuing SFN operation from the UE; and providing (e.g. sending) a response to the UE.

With the response, the selected at least one candidate beam may be acknowledged, e.g. by the apparatus according to the second exemplary aspect. The response may initiate a beam failure recovery procedure. After such a response, the apparatus according to the first exemplary aspect may assume control channel reception based on the selected at least one candidate beam on which SFN operation can continue. Further, the selected at least one candidate beam may be part of a new resource set used or to be used by the apparatus according to the first exemplary aspect. The apparatus according to the first exemplary aspect may be configured with such a new resource set, in accordance with the disclosure of the configuring of the one or more resource sets.

According to an exemplary embodiment of the first exemplary aspect, the method further comprises:

after the obtaining of the response to the provided at least one candidate beam and prior to assuming of the control channel reception, waiting for a pre-determined value or range of values defining a symbol time (e.g. symbols).

The waiting for a pre-determined value or range of values may enable to introduce a guard interval for the SFN operation. Thus, the apparatus according to the first exemplary aspect may provide time needed for an apparatus according to the second exemplary aspect to utilize the selected candidate beam.

For instance, in case of two resource sets of the one or more resource sets (e.g. BFD-RS sets) that are configured on part of the apparatus according to the first exemplary aspect, in the event that a beam failure detection for one of the resource sets (e.g. BFD-RS set) is detected or determined, the apparatus according to the first exemplary aspect may select the at least one candidate beam e.g. based on the association information for SFN operation (if suitable). Further:

after a predetermined time (e.g. a symbol time such as 1 to 50 symbols, e.g. 28 symbols, e.g. after a last symbol is received by the apparatus according to the first exemplary aspect) and optionally after receiving the response from the apparatus according to the second exemplary aspect, the apparatus according to the first exemplary aspect may assume PDCCH reception based on the selected at least one candidate beam (e.g. resource set $\overline{q_{new}}$) and the non-failed configured resource or resource set of the one or more resource sets.

In another example embodiment according to all exemplary aspects, in case of two resource sets of the plurality of resource sets (e.g. BFD-RS sets) that are configured on part of the apparatus according to the first exemplary aspect, in the event that a beam failure for both of these two resource sets (e.g. BFD-RS sets) is detected or determined, the apparatus according to the first exemplary aspect may select at least two candidate beams based on the association information for SFN operation (if suitable). Further, after a predetermined time (e.g. a symbol time such as 1 to 50 symbols, e.g. 28 symbols, e.g. after a last symbol is received by the apparatus according to the first exemplary aspect) and optionally after receiving the response from the apparatus according to the second exemplary aspect e.g. for the beam failure recovery, the apparatus according to the first exemplary aspect may assume PDCCH reception based on both selected candidate beams (e.g. resource sets $\overline{q_{new(s)}}$) for continuing SFN operation.

In another example embodiment according to all exemplary aspects, in case of one resource set (e.g. BFD-RS set) of the one or more resource sets, in the event that a beam failure is detected or determined for this resource set (e.g. BFD-RS set), the apparatus according to the first exemplary aspect may select the at least one candidate beam e.g. based on the association information for SFN operation (if suitable) and may further select in sum two candidate beams to be indicated as $\overline{q_{new}}$. Further:

a predetermined time (e.g. a symbol time such as 1 to 50 symbols, e.g. 28 symbols, e.g. after a last symbol is received by the apparatus according to the first exemplary aspect) and optionally after receiving the response from the apparatus according to the second exemplary aspect e.g. for the beam failure recovery, the apparatus according to the first exemplary aspect may assume PDCCH reception based on $\overline{q_{new(s)}}$.

e.g. there may be one resource set with recovery using two candidate beams;

this may be the mTRP beam failure recovery MAC control element (CE) that indicates the recovery for multiple resource sets (e.g. BFD-RS set (TRP)) but for one failed resource set.

Further, for one resource set (e.g. BFD-RS set), there may be then two or more associated candidate beams respective candidate beam resource sets.

According to an exemplary embodiment of the first exemplary aspect, the method further comprises:

in case at least one candidate beam is not selectable for a respective detected beam failure, assuming control channel reception based on a configured control resource set.

For instance, the at least one candidate beam may not be selectable since e.g. no suitable candidate beam for SFN operation can be found, or if only one suitable candidate beam is found when two resource sets have failed and thus two candidate beams are to be selected/found. The configured control resource set may be a so-called control resource set (CORESET), wherein per respective CORESET with activated TCI state, there may be only one activated TCI state, and the apparatus according to the first exemplary aspect may determine to include one resource set to the one or more resource sets, e.g. to be configured or as configured on part of the apparatus according to the first exemplary aspect.

In any of the example embodiments, if no suitable candidate beam is found respectively can be selected for enabling the apparatus according to the first exemplary aspect to continue SFN operation, after indicating a candidate beam resource set index (if any), the apparatus according to the first exemplary aspect may assume PDCCH reception for the CORESET according to the indicated $\overline{q_{new}}$. This may assume no or discontinued SFN operation e.g. the apparatus according to the first exemplary aspect may assume only TCI states/resource set to be active for the respective CORESET.

In one embodiment, if no suitable candidate is found for SFN operation or if only one suitable candidate is found when two sets have failed, after indicating the candidate beam RS index (if any), UE assumes the PDCCH reception for the CORESET according to the indicated $\overline{q_{new}}$ (this may assume no SFN operation e.g. UE assumes only TCI state/RS to be active for the CORESET).

According to an exemplary embodiment of the first exemplary aspect, based on the obtained association information, the apparatus is configured with an association between at least two resource sets, wherein within that at least two resource sets, a first group of resources is comprised that are associated with another resource set, and/or wherein within that at least two resource sets, a second group of resources for SFN operation is comprised.

The apparatus according to the first exemplary aspect may be configured with the association information that is obtained. The apparatus according to the first exemplary aspect is, thus, configured with association information for one or more resources or resource sets that are valid for SFN operation. Within the one or more resources or resource sets of the obtained association information, a group of resource sets (e.g. SSB or Non-Zero-Power Channel State Reference Signal (NZP-CSI-RS)) may be comprised that may be associated with one or more other resources or resource sets that therefore can be assumed to be valid for continuing of SFN operation in case a beam failure is detected.

For instance, when per-TRP BFR is supported, there can be two candidate sets (e.g. to be selected from), thus, two candidates set per TRP. A group of resources in such a first candidate set (e.g. the first group of resources) can be associated with a/the second group of resources in the second candidate set. Any combinations of such resource pairs (e.g. one from a respective group) from this two groups can be (e.g. assumed to be) suitable for SFN operation.

According to an exemplary embodiment of the first exemplary aspect, the apparatus is a user equipment. For instance, the communication network may be a new radio, NR, communication and the apparatus may be a user equipment for the NR communication network.

According to an exemplary embodiment of the second exemplary aspect, the apparatus is or is comprised in a network node of the communication network. For instance, the communication network may be a new radio, NR, communication and the apparatus may be a gNB for the NR communication network.

The apparatus according to the first exemplary aspect may reside within a cell. The cell may be a serving cell of the apparatus according to the first exemplary aspect. The apparatus according to the second exemplary aspect may be a base station of the serving cell of the apparatus according to the first exemplary aspect. As such, the apparatus according to the second exemplary aspect determines the plurality (e.g. at least two) of resource sets for a respective UE, wherein the respective UE may be an apparatus according to the first exemplary aspect. Such a respective resource set of the one or more resource sets may enable a single frequency network, SFN, operation of the UE, e.g. the respective resource set comprises at least two resources. The determined one or more resource sets are provided to the respective UE, e.g. by sending the determined one or more resource sets, e.g. in the form of the configuration. This may allow the UE (e.g. apparatus according to the first exemplary aspect) to be configured with the one or more resource sets and further, may allow as such, SFN operation since a respective resource set of the one or more resource sets may be valid for SFN operation. Further, to allow the respective UE in case that a beam failure is detected/determined for at least one of the one or more resource sets to continue SFN operation, the association information is provided to the respective UE, e.g. by sending the association information to the UE. The association information may correspond to the association information as disclosed above with regard to the first exemplary aspect.

According to an exemplary embodiment of the second exemplary aspect, the method further comprises:

providing control information to the user equipment via the selected at least one candidate beam of the candidate beam information.

After the respective UE may have selected at least one candidate beam in case that a beam failure of a respective resource/resource set of the one or more resource sets is detected/determined, and the respective UE has waited, as disclosed above, to assume PDCCH reception based on the selected at least one candidate beam (e.g. resource set $\overline{q_{new}}$), control information (e.g. RRC message(s), or a combination thereof may be provided (e.g. sent) to the respective UE via the selected candidate beam, e.g. as indicated by a respective candidate beam information.

The features and example embodiments described above may equally pertain to the different aspects.

It is to be understood that the presentation in this section is merely by way of examples and non-limiting.

Other features will become apparent from the following detailed description considered in conjunction with the accompanying drawings. It is to be understood, however, that the drawings are designed solely for purposes of illustration and not as a definition of the limits, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding and shall be understood to complement and be read together with the description as provided in the above summary section of this specification.

Figure 1:
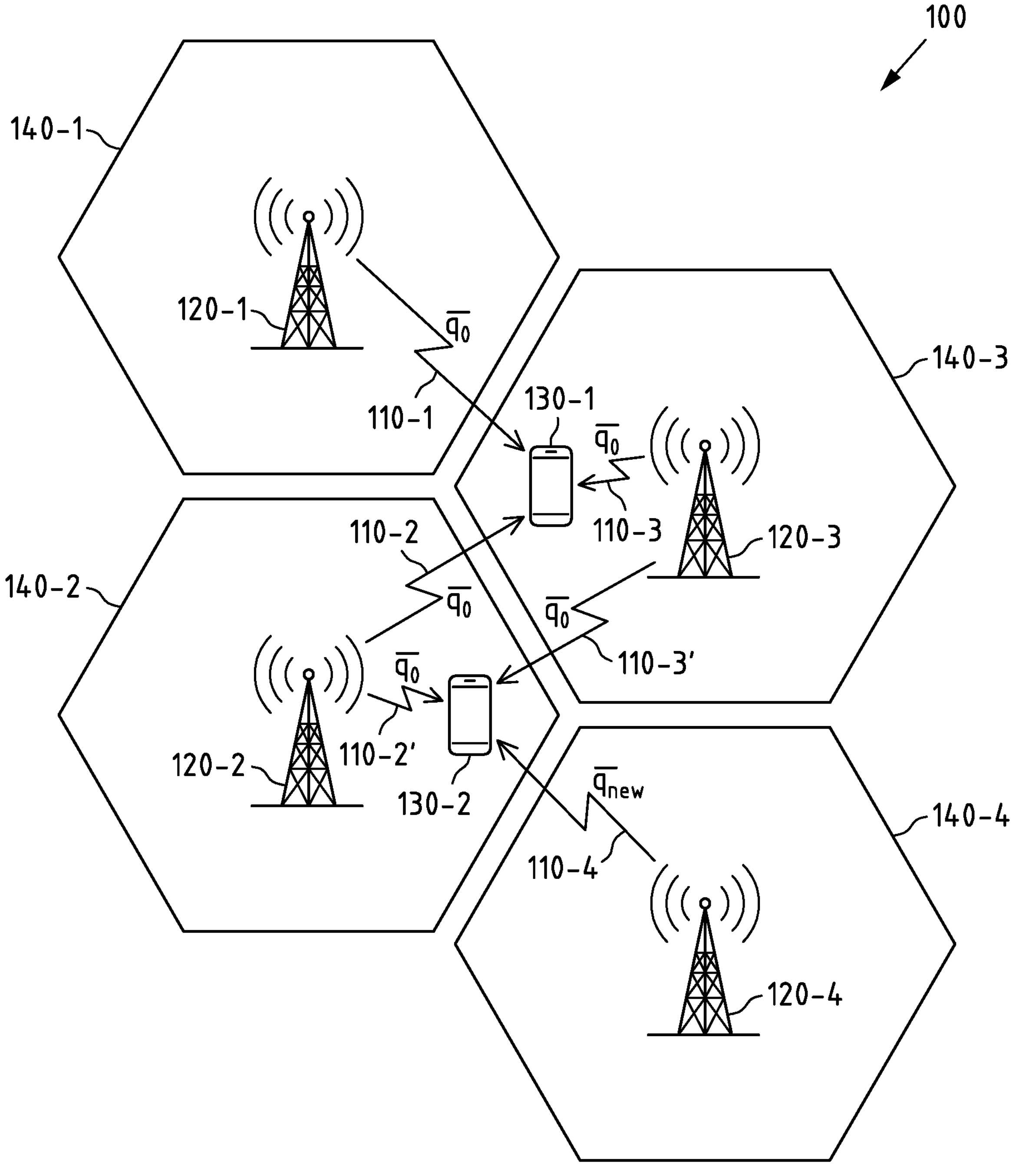
FIG. 1 a schematic block diagram of a system according to an exemplary aspect.

FIG. 1 is a schematic high-level block diagram of a system 100 according to an exemplary aspect. System 100 comprises a gNB 120-1 to 120-4 (e.g. apparatus(es) according to the second exemplary aspect) and a UE 130-1 and 130-2 (e.g. apparatus(es) according to the first exemplary aspect). The gNBs, in FIG. 1, are shown in four exemplary instances. With regard to the UEs, two exemplary entities are shown. The gNBs 120-1 to 120-4 and the UEs 130-1 and 130-2 are part of a radio network, e.g. a mobile communication network according to 5G/NR standard, to name but one non-limiting example. A respective gNB 120-1 to 120-4 is part of a respective cell 140-1 to 140-4. For SFN operation for the UEs 130-1 and 130-2, the gNBs 120-1 to 120-4 provide a same data transmission to the UEs 130-1 and 130-2, wherein separation of the data itself may be done by certain encoding and/or modulation techniques, for instance. The arrows pointing from the gNBs 120-1 to 120-4 to the UEs 130-1 and 130-2 are marked by $\overline{q_0}$ and $\overline{q_{new}}$ which indicates via which resource set the respective gNBs 120-1 to 120-4 provide data transmission(s) to the respective UEs 130-1 and 130-2. The respective data transmission(s) in FIG. 1 are marked by the reference signs 110-1 to 110-4 to be associated with the respective gNB 120-1 to 120-4, and further, for instance the arrows 110-2' and 110-3' illustrate that a same signal comprising data that is e.g. multiplexed and is provided to both of the UEs 130-1 and 130-2 so that the UEs 130-1 and 130-2 can identify and receive a respective data transmission that is intended for their respective reception. For the sake of clarity, signals sent by the gNBs 120-1 to 120-4 may overlap to another/neighboring cell, at least in part, although in FIG. 1, the respective cells 140-1 to 140-4 are shown with borders between them.

For instance, one or more of the following example embodiments according to all exemplary aspects can be performed and/or controlled by the system 100.

System 100 enables, when using SFN, to provide additional information (e.g. association information) to UE 130-1 and/or 130-2 about suitability of radio beams (or downlink Resource (DL RS)) for SFN operation. So, e.g. when two DL RSs are used in SFN, and one of them fails, the information can be used in determining whether or not the SFN operation can continue by selecting suitable candidate cell(s). For instance, some candidate cell(s) could be selected with the current definitions (e.g. RSRP>threshold), but those might not be suitable for SFN operation. Further, candidate cell (e.g. cell 140-4) may not fit the requirement of RSRP>threshold, but is suitable for SFN operation, indicated by $\overline{q_{new}}$ at the arrow 110-4.

In one example, two groups of DL RSs can be associated with each other. This association can be used in determining which beams can be used for SFN operation in BFR. For instance, if beam in one of the groups fails, another can be selected from that group (given that other "normal" requirements for BFR are met). In short terms, it may be allowed to use additional restrictive information (e.g. association information) for selecting candidate beam(s) in SFN operation.

With regard to beam(s) being valid for SFN, the criteria for a beam or beams to be valid may be coming from network implementation constraints, where network (e.g. represented by an apparatus according to the second exemplary aspect) may use (e.g. only) sub-set of transmission and reception points (TRPs) where simultaneous multi-panel transmission by a single TRP may not be feasible (e.g. selected beam pairs cannot be associated with a single TRP). There may be other implementation concerns to limit the beam(s) for SFN mode/operation.

In an example embodiment, UE 130-1 and/or 130-2 is configured with the information (e.g. association information) that which of the DL RS of a cell can be assumed to be valid for SFN operation within the serving cell (or one or more TRPs that may have different Physical Cell Identity (PCI)/Identities but operate under same serving cell ID). This information is used for BFR, more specifically in the candidate beam selection at UE side (UEs 130-1 and/or 130-2) and further as an assumption for continuing or discontinuing SFN operation.

In one embodiment, the information (e.g. association information) is provided as part of one or more of the following:

- beam management configuration;
- cell level configuration;
- beam failure recovery configuration;
- specifically, the candidate beam configuration of beam failure recovery configuration; and
- the candidate beam configuration for mTRP beam failure recovery.
- any configuration provided using RRC signaling (e.g. broadcast signaling SIB or dedicated signaling)
- Association can be provided using MAC/Physical layer signaling.

In one embodiment, UE (e.g. UEs 130-1 and 130-2) is provided with an association (e.g. as part of the association information, for instance) between at least one RS (first RS) and at least one other RS (second RS that is not the first RS), wherein the association is used for SFN operation:

- wherein the association is for beam failure recovery purposes;
- wherein the association can be indicated in group-wise association: a set/group of RS (e.g. Synchronization Signal Block (SSB) SSB #1, SSB #2) can be configured with an association of another group of RS (SSB #3, SSB #4);
  - this means that UE (e.g. UEs 130-1 and 130-2) may select any SSB in first group and any of the second group, and assume SFN operation.

In one embodiment, the groups of RS may overlap by network configuration but UE (e.g. UE 130-1 and/or 130-2) shall select different RS as candidate beam or candidate beams (when recovering two RS sets) if UE (e.g. UE 130-1 and/or 130-2) is provided with association information for SFN operation.

In one embodiment, when the UE (e.g. UE 130-1 and/or 130-2) is provided with an association of at least one RS and at least one other RS, it can assume that the RS(s) (e.g. both RS) can be used for SFN operation.

In one embodiment, in case of two BFD-RS sets, in the event of beam failure detection for one BFD-RS set, UE (e.g. UE 130-1 and/or 130-2) selects the candidate beam based on the provided association for SFN operation (if suitable) after 1 to 50 symbols, e.g. 28 symbols after receiving gNB (e.g. gNBs 120-1, 120-2, 120-3 and/or 120-4) response, UE (e.g. UEs 130-1 and 130-2) assumes PDCCH reception based on $\overline{q_{new}}$ and the non failed RS.

In one embodiment, in case of two BFD-RS sets, in the event of beam failure detection for both of these BFD-RS sets, UE (e.g. UE 130-1 and/or 130-2) selects the candidate beams based on the provided association for SFN operation (if suitable)

- after 1 to 50 symbols, e.g. 28 symbols after receiving gNB (e.g. gNBs 120-1, 120-2, 120-3 and/or 120-4) response for the beam failure recovery, UE assumes PDCCH reception based on both $\overline{q_{new(s)}}$ in SFN manner.

In one embodiment, in case of one BFD-RS set, in the event of beam failure detection for the BFD-RS set, UE (e.g. UEs 130-1 and 130-2) selects the candidate beam based on the provided association for SFN operation (if suitable) and may select two candidates to be indicated as $\overline{q_{new}}$

- after 1 to 50 symbols, e.g. 28 symbols after receiving gNB (e.g. gNBs 120-1, 120-2, 120-3 and/or 120-4) response, UE (e.g. UE 130-1 and/or 130-2) assumes PDCCH reception based on $\overline{q_{new(s)}}$
- e.g. there can be one set with recovery using two candidates
- this can be the mTRP BFR MAC CE that indicates the recovery for multiple BFD-RS set (TRP) but for one failed RS set
- for one BFD-RS set there could be then two or more associated candidate beam RS sets.

In one embodiment, a specific threshold may be configured for the candidate beam selection for the associated RS. As an example, a/the lower RSRP threshold may be configured/tolerated for the candidate beam if the SFN operation can continue.

In any of the embodiments, if no suitable candidate is found for SFN operation, after indicating the candidate beam RS index (if any), UE (e.g. UEs 130-1 and 130-2) assumes the PDCCH reception for the CORESET according to the indicated $\overline{q_{new}}$ (this may assume no SFN operation e.g. UE (e.g. UE 130-1 and/or 130-2) assumes only TCL states/RS to be active for the CORESET).

In one embodiment, if no suitable candidate is found for SFN operation or if only one suitable candidate is found when two sets have failed, after indicating the candidate beam RS index (if any), UE (e.g. UE 130-1 and/or 130-2) assumes the PDCCH reception for the CORESET according to the indicated $\overline{q_{new}}$ (this may assume no SFN operation e.g. UE assumes only TCI state/RS to be active for the CORESET).

In one embodiment, UE (e.g. UE 130-1 and/or 130-2) may be configured with a set of downlink RS or within that set a group of RS (e.g. SSB or Non-Zero-Power Channel State Reference Signal (NZP-CSI-RS)) that are associated with another set or within that set, a group of RS for SFN operation purposes.

This may allow to

- provide continuity for SFN operation which is an operation mode for high speed (mobility) communication;
- UE (e.g. UE 130-1 and/or 130-2) can be configured to select more relevant candidates for operation resulting in lower power consumption, lower signaling overhead between network (e.g. represented by gNBs 120-1 to 120-4) and UE (e.g. UE 130-1 and/or 130-2), increased throughput and increased reliability for SFN/high speed deployment.

Figure 2:
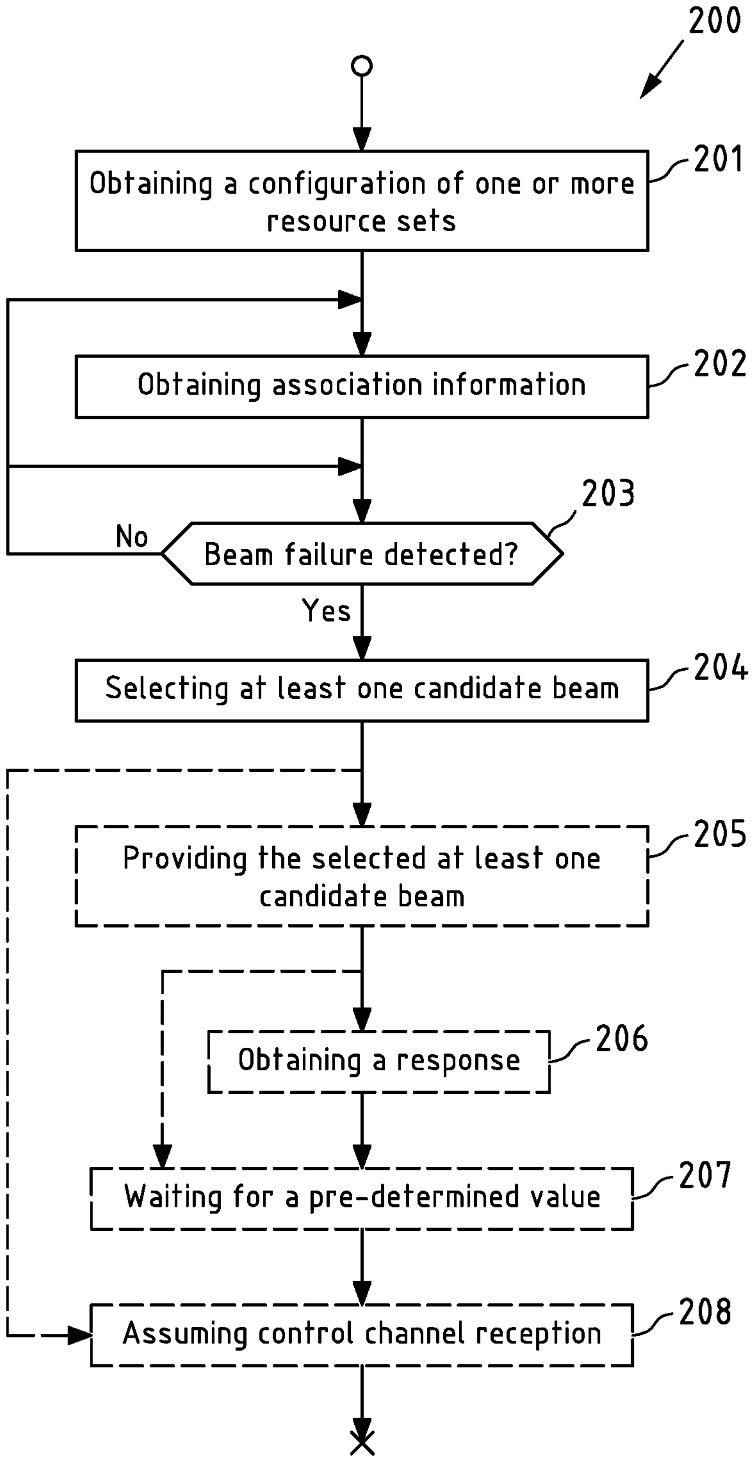
FIG. 2 a flowchart showing an example embodiment of a method according to the first exemplary aspect.

FIG. 2 is a flowchart 200 showing an example embodiment of a method according to the first exemplary aspect. This flowchart 200 may for instance be performed by a UE, e.g. an apparatus according to the first exemplary aspect that may be represented by the UE 130-1 and/or 130-2 of FIG. 1.

In a first step 201, a configuration is obtained. The configuration is of one or more resource sets that may configure the apparatus performing and/or controlling the flowchart 200. The one or more resource sets may be obtained (e.g. received) from an apparatus performing and/or controlling the flowchart 300 of FIG. 3. The apparatus performing the flowchart 200 may thus be configured for SFN operation, at least in the downlink, by using a respective resource set of the one or more resource sets.

Figure 3:
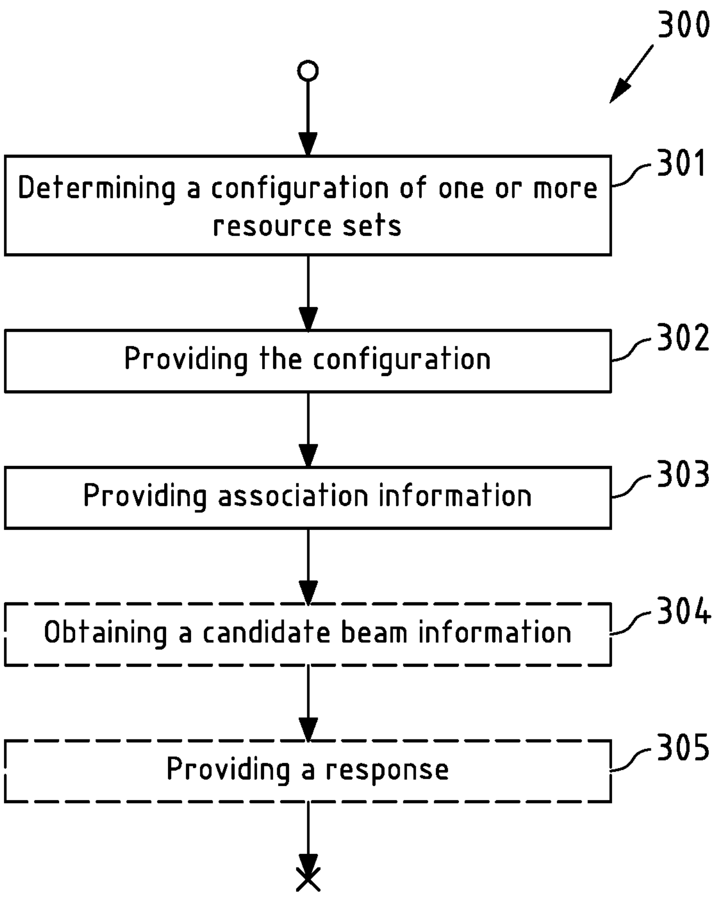
FIG. 3 a flowchart showing an example embodiment of a method according to the second exemplary aspect.

In a second step 202, association information may be obtained, e.g. by receiving the association information from the apparatus performing and/or controlling the flowchart 300 of FIG. 3. In case of a beam failure that can be detected/determined (see next step 203) by the apparatus performing the flowchart 200, the association information can be used to select at least one candidate beam to be used by the apparatus performing the flowchart 200 instead of the beam for which the beam failure is detected. The association information may comprise one or more resource sets that are valid for SFN operation of the apparatus performing the flowchart 200, so that when the apparatus performing the flowchart 200 starts to use such resource sets, it is ensured respectively highly likely that the apparatus performing the flowchart 200 can continue SFN operation.

In a third step 203, it is checked whether a beam failure is present for one or more resource sets that are used by the apparatus performing the flowchart 200 for downlink transmission(s). In case a currently used beam has not failed, the apparatus performing the flowchart 200 may continue e.g. with obtaining (e.g. updated/new) association information (e.g. in case it has moved, to name but one non-limiting example), and/or to check if another beam failure e.g. of another resource set is present.

In case a beam failure is detected, at least one candidate beam is selected based, at least in part, on the association information.

In an optional second step 205, the selected at least one candidate beam is provided, e.g. by sending it in the form of a candidate beam information to the apparatus performing and/or controlling the flowchart 300 of FIG. 3. In another optional step 206, a response to the provided and selected at least one candidate beam is obtained, e.g. by receiving it from the apparatus performing and/or controlling the flowchart 300 of FIG. 3.

In an optional step 207, the apparatus performing the flowchart 200 waits for a pre-determined value, e.g. amount of time. For instance, the apparatus performing the flowchart 200 may wait for e.g. 20-30 symbols. Then, the apparatus starts to assume, in an optional step 208, control channel reception via the selected at least one candidate beam of step 204. The waiting may ensure synchronization have taken place so that the SFN operation of the apparatus performing the flowchart 200 is valid.

FIG. 3 is a flowchart 300 showing an example embodiment of a method according to the second exemplary aspect. This flowchart 300 may for instance be performed by an apparatus according to the second exemplary aspect, e.g. represented by a gNB e.g. 120-1 to 120-4 of FIG. 1.

In a first step 301, a configuration of one or more resource sets is determined. For instance, the one or more resource sets are determined to be used by the apparatus performing and/or controlling the flowchart 200 of FIG. 2 for its SFN operation.

In a second step 302, the determined configuration of one or more resource sets of step 301 is provided, e.g. by sending the configuration to the apparatus performing and/or controlling the flowchart 200 of FIG. 2. The steps 301 and 302 may for instance be repeated, e.g. in case the apparatus of the flowchart 200 of FIG. 2 may have moved within the communication network. Such an update of the one or more resource sets may for instance be performed after a lapse of a certain interval, to name but one non-limiting example.

In a third step 303, association information is provided, e.g. by sending the association information to the apparatus performing and/or controlling the flowchart 200 of FIG. 2. In addition to the one or more resource sets provided in step 302, the association information is indicative of one or more downlink resource sets that are valid for SFN operation of the apparatus performing the flowchart 200 of FIG. 2. This may mean that either such a respective resource set is explicitly comprised by or represented by the association information, or due to an association/link as comprised by or represented by the association information between such resource sets, the apparatus performing and/or controlling the flowchart 200 of FIG. 2 may assume that the respective resource set(s) that is (are) linked/associated are also valid for SFN operation of the apparatus performing and/or controlling the flowchart 200 of FIG. 2.

In an optional fourth step 304, a candidate beam information e.g. being indicative of at least one candidate beam that is selected, e.g. by the apparatus performing and/or controlling the flowchart 200 of FIG. 2 in case it detected/determined a beam failure in one of the one or more resource sets to continue SFN operation on/via the selected candidate beam, is obtained (e.g. received).

In an optional fifth step 305, in response to the obtained candidate beam information of step 304, a response is provided, e.g. by acknowledging the obtained candidate information e.g. via RRC message/signaling, and/or in an implicit manner, e.g. by providing control information via a respective control channel (e.g. PDCCH) of the selected at least one candidate beam, to name but a few non-limiting examples.

Figure 4:
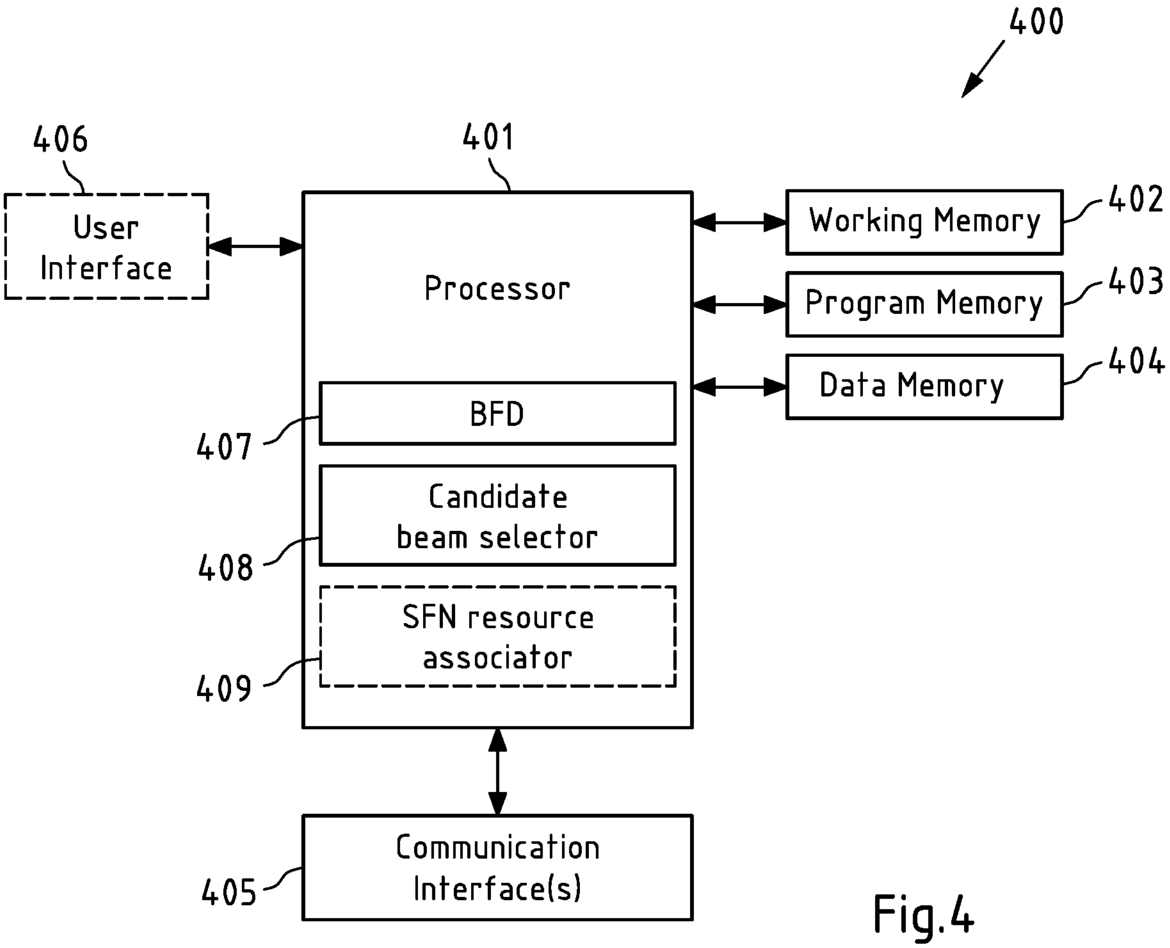
FIG. 4 a schematic block diagram of an apparatus configured to perform the method according to the first exemplary aspect.

FIG. 4 is a schematic block diagram of an apparatus 400 according to the first exemplary aspect, which may for instance represent the apparatus (e.g. UE) 130-1 and/or 130-2 of FIG. 1. Apparatus 400 may be enabled to perform and/or control the flowchart 200 of FIG. 2.

Apparatus 400 comprises a processor 401, working memory 402, program memory 403, data memory 404, communication interface(s) 405, and an optional user interface 406.

Apparatus 400 may for instance be configured to perform and/or control or comprise respective means (at least one of 401 to 406) for performing and/or controlling the method according to the first exemplary aspect. Apparatus 400 may as well constitute an apparatus comprising at least one processor (401) and at least one memory (402) including computer program code, the at least one memory and the computer program code configured to, with the at least one processor, cause an apparatus, e.g. apparatus 400 at least to perform and/or control the method according to the first exemplary aspect.

Processor 401 may for instance comprise a beam failure detector BFD 407 as a functional and/or structural unit. Beam failure detector BFD 407 may for instance be configured to detect/determine one or more beam failures (see step 203 of FIG. 2).

Processor 401 may for instance comprise a candidate beam selector 408 as a functional and/or structural unit. Candidate beam selector 408 may for instance be configured to select at least one candidate beam in case of a detected/determined beam failure on a respective resource set of the one or more resource sets (see step 204 of FIG. 2).

Processor 401 may for instance comprise a SFN resource associator 409 as a functional and/or structural unit. SFN resource associator 409 may for instance be configured to associate one or more resource sets with one or more other resource sets so that the apparatus 400 can assume that the associated resource sets are valid for SFN operation of the apparatus 400.

Processor 401 may for instance further control the memories 402 to 404, the communication interface(s) 405, and the optional user interface 406.

Processor 401 may for instance execute computer program code stored in program memory 403, which may for instance represent a computer readable storage medium comprising program code that, when executed by processor 401, causes the processor 401 to perform the method according to the first exemplary aspect.

Processor 401 (and also any other processor mentioned in this specification) may be a processor of any suitable type. Processor 401 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 401 may for instance be an application processor that runs an operating system.

Program memory 403 may also be included into processor 401. This memory may for instance be fixedly connected to processor 401, or be at least partially removable from processor 401, for instance in the form of a memory card or stick. Program memory 401 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 403 may also comprise an operating system for processor 401. Program memory 403 may also comprise a firmware for apparatus 400.

Apparatus 400 comprises a working memory 402, for instance in the form of a volatile memory. It may for instance be a Random Access Memory (RAM) or Dynamic RAM (DRAM), to give but a few non-limiting examples. It may for instance be used by processor 401 when executing an operating system and/or computer program.

Data memory 404 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 404 may for instance store one or more resource sets, one or more pieces of association information, one or more selected candidate beams, one or more pieces of candidate beam information, one or more pre-determined values or value ranges, or a combination thereof.

Communication interface(s) 405 enable apparatus 400 to communicate with other entities, e.g. with a serving node, e.g. gNB 120-1 to 120-4 of FIG. 1. The communication interface(s) 405 may for instance comprise a wireless interface, e.g. a cellular radio communication interface and/or a WLAN interface and/or wire-bound interface, e.g. an IP-based interface, for instance to communicate with entities via the Internet.

User interface 406 is optional and may comprise a display for displaying information to a user and/or an input device (e.g. a keyboard, keypad, touchpad, mouse, etc.) for receiving information from a user.

Some or all of the components of the apparatus 400 may for instance be connected via a bus. Some or all of the components of the apparatus 400 may for instance be combined into one or more modules.

Figure 5:
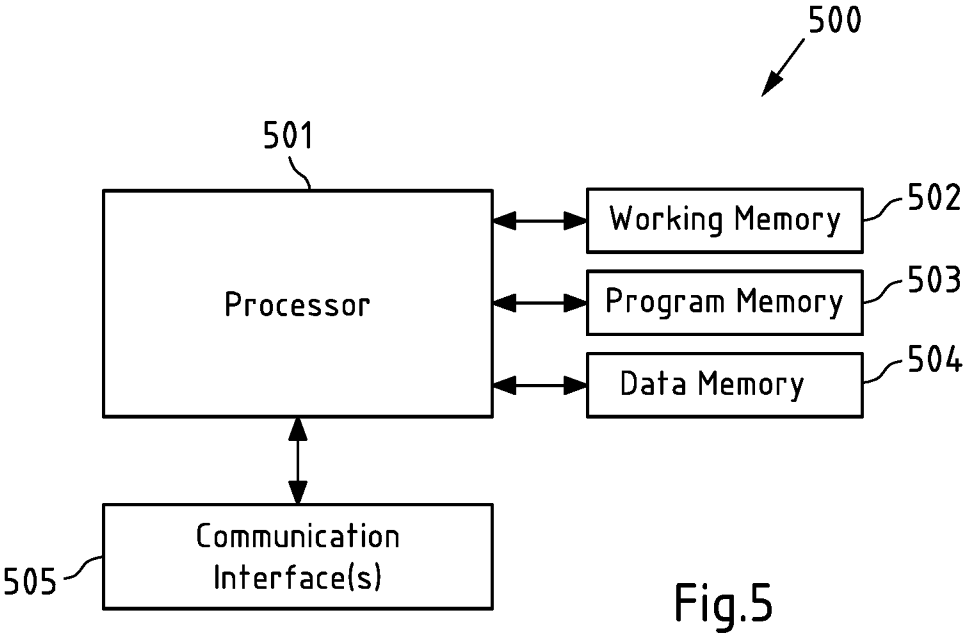
FIG. 5 a schematic block diagram of an apparatus configured to perform the method according to the first exemplary aspect.

FIG. 5 is a schematic block diagram of an apparatus 500 according to the second exemplary aspect, which may for instance represent the apparatus (e.g. a gNB) 120-1 to 120-4 of FIG. 1. Apparatus 500 may be enabled to perform and/or control the flowchart 300 of FIG. 3.

Apparatus 500 comprises a processor 501, working memory 502, program memory 503, data memory 504, and a communication interface(s) 505.

Apparatus 500 may for instance be configured to perform and/or control or comprise respective means (at least one of 501 to 505) for performing and/or controlling the method according to the second exemplary aspect. Apparatus 500 may as well constitute an apparatus comprising at least one processor (501) and at least one memory (502) including computer program code, the at least one memory and the computer program code configured to, with the at least one processor, cause an apparatus, e.g. apparatus 500 at least to perform and/or control the method according to the second exemplary aspect.

Processor 501 may for instance further control the memories 502 to 504, the communication interface(s) 505.

Processor 501 may for instance execute computer program code stored in program memory 503, which may for instance represent a computer readable storage medium comprising program code that, when executed by processor 501, causes the processor 501 to perform the method according to the second exemplary aspect.

Processor 501 (and also any other processor mentioned in this specification) may be a processor of any suitable type. Processor 501 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 501 may for instance be an application processor that runs an operating system.

Program memory 503 may also be included into processor 501. This memory may for instance be fixedly connected to processor 501, or be at least partially removable from processor 501, for instance in the form of a memory card or stick. Program memory 501 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 503 may also comprise an operating system for processor 501. Program memory 503 may also comprise a firmware for apparatus 500.

Apparatus 500 comprises a working memory 502, for instance in the form of a volatile memory. It may for instance be a Random Access Memory (RAM) or Dynamic RAM (DRAM), to give but a few non-limiting examples. It may for instance be used by processor 501 when executing an operating system and/or computer program.

Data memory 504 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 504 may for instance store one or more resource sets, one or more pieces of association information, one or more selected candidate beams, one or more pieces of candidate beam information, one or more pre-determined values or value ranges, or a combination thereof.

Communication interface(s) 505 enable apparatus 500 to communicate with other entities, e.g. with a UE 130-1 and/or 130-2 of FIG. 1. The communication interface(s) 505 may for instance comprise a wireless interface, e.g. a cellular radio communication interface and/or a WLAN interface) and/or wire-bound interface, e.g. an IP-based interface, for instance to communicate with entities via the Internet.

Some or all of the components of the apparatus 500 may for instance be connected via a bus. Some or all of the components of the apparatus 500 may for instance be combined into one or more modules.

The following embodiments shall also be considered to be disclosed:

Embodiment 1

A method performed and/or controlled by at least one first apparatus (e.g. a UE), the method comprising:

obtaining a configuration of one or more resource sets enabling a single frequency network, SFN, operation of the first apparatus in a communication network;

obtaining association information indicative of one or more downlink resources of a cell of the communication network that is valid for the SFN operation of the first apparatus;

detecting a beam failure for at least one of the resource sets of the obtained configuration; and in response to the detecting of the beam failure, selecting at least one candidate beam based on the obtained association information enabling to continue the SFN operation of the first apparatus.

Embodiment 2

The method according to embodiment 1, wherein the SFN operation is within a serving cell or within one or more cells having a same identifier as a serving cell identifier of a respective serving cell of the first apparatus.

Embodiment 3

The method according to embodiment 1 or embodiment 2, wherein the SFN operation is enabled by a respective resource set by, based on the respective resource set, two or more activated transmission configuration indication states are applied (e.g. by the at least one first apparatus, e.g. a UE) for receiving control information.

Embodiment 4

The method according to any of the preceding embodiments, wherein the association information is obtained as part of one or more of the following:

i) beam management configuration;

ii) cell level configuration;

iii) beam failure recovery configuration;

iv) a certain candidate beam configuration of a beam failure recovery configuration;

v) a certain candidate beam configuration of a multiple transmission and reception, mTRP, beam failure recovery configuration;

vi) any configuration provided using RRC signaling (e.g. broadcast signaling SIB or dedicated signaling); and vii) using MAC/Physical layer signaling.

Embodiment 5

The method according to any of the preceding embodiments, wherein the association information further comprises an association between at least one first resource and at least one second resource, wherein the candidate beam is selected based, at least in part, on an assumption that the at least one second resource is valid for SFN operation if the at least one first resource is valid for SFN operation.

Embodiment 6

The method according to any of the preceding embodiments, wherein a respective candidate beam is selected for a respective beam failure that is detected.

Embodiment 7

The method according to any of the preceding embodiments, further comprising means for:

providing the selected at least one candidate beam.

Embodiment 8

The method according to embodiment 7, further comprising:

obtaining a response to the provided and selected at least one candidate beam; and assuming control channel reception based on the selected at least one candidate beam.

Embodiment 9

The method according to embodiment 8, further comprising:

after the obtaining of the response to the provided at least one candidate beam and prior to assuming of the control channel reception, waiting for a pre-determined value or range of values defining a symbol time.

Embodiment 10

The method according to any of the preceding embodiments, further comprising:

in case at least one candidate beam is not selectable for a respective detected beam failure, assuming control channel reception based on a configured control resource set.

Embodiment 11

The method according to any of the preceding embodiments, based on the obtained association information, the first apparatus is configured with an association between at least two resource sets, wherein within that at least two resource sets, a first group of resources is comprised that are associated with another resource set, and/or wherein within that at least two resource sets, a second group of resources for SFN operation is comprised.

Embodiment 12

The method according to any of the preceding embodiments, wherein the first apparatus is a user equipment.

Embodiment 13

A method performed and/or controlled by at least one second apparatus (e.g. a base station), the method comprising:

determining a configuration of one or more resource sets for a user equipment, UE, in a communication network, wherein the one or more resource sets enable a single frequency network, SFN, operation of the UE in a communication network;

providing, to the UE, the determined configuration; and providing, to the UE, association information indicative of one or more downlink resources of a cell which are valid for the SFN operation of the UE.

Embodiment 14

The method according to embodiment 13, further comprising:

obtaining a candidate beam information indicative of a selected at least one candidate beam for continuing SFN operation from the UE; and providing a response to the UE.

Embodiment 15

The method according to embodiment 13 and embodiment 14, further comprising:

providing control information to the user equipment via the selected at least one candidate beam of the candidate beam information.

Embodiment 16

The method according to any of the embodiments 13 to 15, wherein the second apparatus is or is comprised in a network node of the communication network.

Embodiment 17

The method according to any of the embodiments 13 to 16, wherein the second apparatus is part of a serving cell or is part of a cell having a same identifier as a respective serving cell identifier of a serving cell of the user equipment.

Embodiment 18

The method according to any of the embodiments 13 to 17, wherein the association information is provided as part of one or more of the following:

i) beam management configuration;

ii) cell level configuration;

iii) beam failure recovery configuration;

iv) a certain candidate beam configuration of a beam failure recovery configuration;

v) a certain candidate beam configuration of a multiple transmission and reception, mTRP, beam failure recovery configuration;

vi) any configuration provided using RRC signaling (e.g. broadcast signaling SIB or dedicated signaling); and vii) using MAC/Physical layer signaling.

Embodiment 19

The method according to any of the embodiments 13 to 18, wherein the association information further comprises an association between at least one first resource and at least one second resource (e.g. that is different from the first resource and that is used for the SFN operation), wherein the candidate beam is selected based, at least in part, on an assumption that the at least one second resource is valid for SFN operation if the at least one first resource is valid for SFN operation.

Embodiment 20

The method according to any of the embodiments 13 to 19, wherein the provided association information comprises an association between at least two resource sets, wherein within that at least two resource sets, a first group of resources is comprised that are associated with another resource set, and/or wherein within that at least two resource sets, a second group of resources for SFN operation is comprised.

Embodiment 21

An apparatus configured to perform and/or control or comprising respective means for performing and/or controlling the method of any of the embodiments 1 to 12.

Embodiment 22

An apparatus comprising at least one processor and at least one memory including computer program code, the at least one memory and the computer program code configured to, with the at least one processor, cause an apparatus at least to perform and/or control the method of any of the embodiments 1 to 12.

Embodiment 23

An apparatus configured to perform and/or control or comprising respective means for performing and/or controlling the method of any of the embodiments 13 to 20.

Embodiment 24

An apparatus comprising at least one processor and at least one memory including computer program code, the at least one memory and the computer program code configured to, with the at least one processor, cause an apparatus at least to perform and/or control the method of any of the embodiments 13 to 20.

Embodiment 25

A system comprising:
at least one first apparatus according to any of the embodiments 21 and 22; and
at least one second apparatus according to any of the embodiments 23 and 24.

Embodiment 26

A system comprising at least a first apparatus and a second apparatus, wherein the first apparatus comprises means configured to perform:
obtaining a configuration of one or more resource sets enabling a single frequency network, SFN, operation of the first apparatus in a communication network;
obtaining association information indicative of one or more downlink resources of a cell of the communication network that is valid for the SFN operation of the first apparatus;
detecting a beam failure for at least one of the resource sets of the obtained configuration; and
in response to the detecting of the beam failure, selecting at least one candidate beam based on the obtained association information enabling to continue the SFN operation of the first apparatus.
and wherein the second apparatus comprises means configured to perform:
determining a configuration of one or more resource sets for a user equipment, UE, in a communication network, wherein the one or more resource sets enable a single frequency network, SFN, operation of the UE in a communication network;
providing, to the UE, the determined configuration; and
providing, to the UE, association information indicative of one or more downlink resources of a cell which are valid for the SFN operation of the UE.

Embodiment 27

A computer program comprising instructions or a computer readable medium comprising program instructions for causing an apparatus to perform and/or control the method of any of the embodiments 1 to 12.

Embodiment 28

A tangible computer-readable medium storing computer program code, the computer program code when executed by a processor causing an apparatus to perform and/or control the method of any of the embodiments 1 to 12.

Embodiment 29

A computer program comprising instructions or a computer readable medium comprising program instructions for causing an apparatus to perform and/or control the method of any of the embodiments 13 to 20.

Embodiment 30

A tangible computer-readable medium storing computer program code, the computer program code when executed by a processor causing an apparatus to perform and/or control the method of any of the embodiments 13 to 20.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the FIGURES shall be considered as one possible sequence of method steps for the respective embodiment described by the respective FIGURE.

The subject-matter has been described above by means of example embodiments. It should be noted that there are alternative ways and variations which are obvious to a skilled person in the art and can be implemented without deviating from the scope of the appended claims.

ABBREVIATIONS

BFD Beam Failure Detection
BFD-RS Beam Failure Detection Reference Signal
BFR Beam Failure Recovery
CORESET Control Resource Set
CSI Channel State Information
CSI-RS Channel State Information Reference Signal
DL RS Downlink Reference Signal
DMRS Demodulation Reference Signal
HST High-Speed Train
MAC Medium Access Control
MAC CE MAC Control Element
mTRP multiple Transmission and Reception Point
NR New Radio
NW Network
NZP-CSI-RS Non-Zero-Power Channel State Reference Signal
PCI Physical Cell Identity
PDCCH Physical Downlink Control channel
QCL Quasi Co-Location
RRC Radio Resource Control
RS Resource
RSRP Reference Signal Received Power
SFN Single Frequency Network
SSB Synchronization Signal Block
TCI Transmission Configuration Indication
TRP Transmission and Reception Point
UE User Equipment

The invention claimed is:

1. A user equipment comprising means for:

obtaining a configuration of one or more resource sets enabling a single frequency network, SFN, operation of the user equipment in a communication network, wherein the SFN operation is enabled by a respective resource set by, based on the respective resource set, two or more activated transmission configuration indication states applied for receiving control information, wherein the SFN operation is within a serving cell or within one or more cells having a same identifier as a serving cell identifier of a respective serving cell of the user equipment;

obtaining association information indicative of one or more downlink resources of a cell of the communication network that is valid for the SFN operation of the user equipment, wherein the association information further comprises an association between at least one first resource and at least one second resource, wherein the association information further comprises a group-wise association in which a first set of synchronization signal blocks, SSBs, is configured with an association of another set of SSBs such that the user equipment selects any SSB in the first group and any SSB in the second group and assumes SFN operation, wherein the association information is obtained as part of the following:

i) beam management configuration;

ii) cell level configuration;

iii) beam failure recovery configuration;

iv) a certain candidate beam configuration of a beam failure recovery configuration; and v) a certain candidate beam configuration of a multiple transmission and reception, mTRP, beam failure recovery configuration, wherein, based on the obtained association information, the user equipment is configured with an association between at least two resource sets, wherein within that at least two resource sets, a first group of resources is comprised that are associated with another resource set, and wherein within that at least two resource sets, a second group of resources for SFN operation is comprised;

detecting a beam failure for at least one of the resource sets of the obtained configuration;

in response to the detecting of the beam failure, selecting at least one candidate beam, based on the obtained association information, that is valid for the SFN operation of the user equipment enabling to continue the SFN operation of the user equipment, wherein the candidate beam is selected based, at least in part, on an assumption that the at least one second resource is valid for SFN operation if the at least one first resource is valid for SFN operation, wherein a respective candidate beam is selected for a respective beam failure that is detected, wherein, in case of two beam failure detection reference signal, BFD-RS, sets, in an event of beam failure detection for one BFD-RS set, the user equipment selects the candidate beam based on the provided association for SFN operation;

providing the selected at least one candidate beam;

obtaining a response to the provided and selected at least one candidate beam;

waiting for a pre-determined value or range of values defining a symbol time, wherein the pre-determined value or range of values comprises 1 to 50 symbols; and assuming control channel reception based on the selected at least one candidate beam, wherein after receiving the response the user equipment assumes physical downlink control channel, PDCCH, reception based on the selected candidate beam and a non-failed resource set.

* * * * *